(12) United States Patent
Santos et al.

(10) Patent No.: US 9,041,684 B2
(45) Date of Patent: May 26, 2015

(54) SENSELINE DATA ADJUSTMENT METHOD, CIRCUIT, AND SYSTEM TO REDUCE THE DETECTION OF FALSE TOUCHES IN A TOUCH SCREEN

(75) Inventors: Maria Rhea Santos, Singapore (SG); Kusuma Adi Ningrat, Singapore (SG); Wah Wah Soe, Singapore (SG)

(73) Assignee: STMICROELECTRONICS ASIA PACIFIC PTE LTD, Singapore (SG)

(*) Notice: Subject to any disclaimer, the term of this patent is extended or adjusted under 35 U.S.C. 154(b) by 232 days.

(21) Appl. No.: 13/585,749

(22) Filed: Aug. 14, 2012
(Under 37 CFR 1.47)

(65) Prior Publication Data
US 2014/0049501 A1 Feb. 20, 2014

(51) Int. Cl.
G06F 3/045 (2006.01)
G06F 3/044 (2006.01)

(52) U.S. Cl.
CPC .................................. G06F 3/044 (2013.01)

(58) Field of Classification Search
None
See application file for complete search history.

(56) References Cited

U.S. PATENT DOCUMENTS

| | | |
|---|---|---|
| 5,543,588 A | 8/1996 | Bisset et al. |
| 2007/0229477 A1 | 10/2007 | Ludwig |
| 2009/0273583 A1 | 11/2009 | Norhammar |
| 2012/0161794 A1 | 6/2012 | Ningrat |
| 2013/0321327 A1* | 12/2013 | Lee et al. ............. 345/174 |

OTHER PUBLICATIONS

Fontanella, L. et al., "Touch Position Determining Device and Method, and Electronic Touch-Sensitive Device," pp. 1-14, U.S. Appl. No. 11/990,384, filed Jun. 5, 2009.
STMicroelectronics, "S-Touch advanced resistive touchscreen controller with 8-bit GPIO expander," pp. 1-65. Doc ID 14489 Rev 6. www.st.com, Sep. 2011.

* cited by examiner

*Primary Examiner* — Joseph Haley
*Assistant Examiner* — Ifedayo Iluyomade
(74) *Attorney, Agent, or Firm* — Seed IP Law Group PLLC

(57) ABSTRACT

A touch controller processes a captured data frame and detects the presence of touch points in the data frame. The data frame includes a plurality of digital capacitance values organized as groups of sense line data and the touch controller determines for each digital capacitance value in a group of sense line data the difference between the digital capacitance value and an associated no-touch threshold to generate a baseline delta value for each digital capacitance value in the group. The touch controller selects the minimum baseline delta and adjusts each digital capacitance value in the group by the minimum baseline delta to generate adjusted sense line data. The touch control generates adjusted sense line data for each group of sense line data in the data frame and thereafter processes the groups of adjusted sense line data to detect the presence of touch points in the data frame.

15 Claims, 6 Drawing Sheets

SENSELINE DATA ADJUSTMENT METHOD, CIRCUIT, AND SYSTEM TO REDUCE THE DETECTION OF FALSE TOUCHES IN A TOUCH SCREEN

TECHNICAL FIELD

The present disclosure relates generally to touch screens and relates more specifically to the elimination of the detection of false touches on a touch screen.

BACKGROUND

Touch panels or touch screens are present in many different types of common modern electronic devices, such as cellular telephones, tablet computers, portable music and video devices, personal digital assistants, portable gaming devices, and so on. In these electronic devices the touch screen is part of the user interface of the device. The touch screen typically includes a display, touch sensors, and a touch controller. The touch sensors are typically some sort of transparent sensor array, such as an ultrasonic, resistive, vibration, or capacitive sensor array, that is attached to or formed as an integral part of the display. When a user touches the sensor array either with a finger or a stylus, the sensor array generates corresponding electronic sensor signals that are provided to the touch controller. From these sensor signals, the touch controller detects the occurrence of a touch or touch point $P(X,Y)$. The touch controller also determines the type of "touch event" to be associated with the touch point $P(X,Y)$, along with various characteristics of the touch event, and provides this information to processing circuitry in the electronic device. The processing circuitry operates in response to this information to allow a user to control the electronic device through these touches or touch points $P(X,Y)$ on the touch screen.

The touch controller captures frame data from the touch sensors and processes this frame data to detect the presence of a touch point $P(X,Y)$ and the type of touch event (i.e., touch-in event, touch-out event, touch-motion event) associated with the touch point. This processing is typically referred to as touch frame processing and through this processing the touch controller generates touch information including the type of touch event and the location of the touch event on the touch screen. The touch controller must reliably detect the presence of touch points $P(X,Y)$ from the frame data. The detection of false touches in a touch screen occurs where the frame data from the touch sensors indicates a touch point $P(X,Y)$ has occurred at a corresponding location on the touch screen when in fact no such touch point did in fact occur at that location, as will now be described in more detail below.

A typical capacitive touch sensor is formed by an array of conductive force lines $Ci$ and sense lines $Lj$ that are arranged in orthogonal to one another to form a matrix or array of touch or sensor nodes $CiLj$. The force lines $Ci$ may be viewed as column lines and the sense lines $Lj$ as row lines, where the array includes "i" force lines and "j" sense lines. The sensor nodes collectively detect the touch information, which includes location information (i.e., which sensor nodes indicate the presence of touch point), the touch event type, along with other parameters like pressure, size, and so on, as will be appreciated by those skilled in the art. The sensor nodes $CiLj$ detect the touch information through variations of four "fringing" capacitances associated with each sensor node $Ci,Lj$.

Unfortunately, most capacitive touch screens are prone to unwanted capacitive changes in the sensor nodes $CiLj$ even when there is no touch point $P(X,Y)$ being applied. These unwanted capacitive changes may be detected by the touch controller as false touches. For example, when a sensor node $CiLj$ associated with a given sense line $Lj$ (i.e., in a given row of the sensor node array) is touched by a touch point $P(X,Y)$, such a "touch" is a "true" touch and is detected as such in the form of the associated capacitance of the node exceeding an associated touch threshold. In this situation, however, the capacitances of the other sensor nodes $Ci,Lj$ of the same sense line $Lj$ also change, even without a touching or a touch point having actually occurred at the locations of these other sensor nodes. This is true because the single sensor node $Ci,Lj$ at which a "true" touch point $P(X,Y)$ has occurred affects its neighboring sensor nodes as well as the whole sense line $Lj$ with a similar pattern of incremented or decremented capacitance values. If the capacitance values of these other sensor nodes $CiLj$ that are part of the same sense line $Lj$ cross the touch threshold, then the frame data associated with these other sensor nodes, when processed, may indicate that false touches have occurred at these other sensor nodes as well.

There is accordingly a need for improved circuits, systems, and methods of eliminating or reducing the detection of false touches in a touch screen.

SUMMARY

According to one embodiment, a touch controller is operable to process a captured data frame and detect the presence of touch points in the data frame. The data frame includes a plurality of digital capacitance values organized as groups of sense line data and the touch controller is operable to determine for each digital capacitance value in a group of sense line data the difference between the digital capacitance value and an associated no-touch threshold to generate a baseline delta value for each digital capacitance value in the group. The touch controller is further operable to select the minimum baseline delta and adjust each digital capacitance value in the group by the minimum baseline delta to generate adjusted sense line data. The touch control is operable to generate adjusted sense line data for each group of sense line data in the data frame and thereafter operates to process the groups of adjusted sense line data to detect the presence of touch points in the data frame.

DETAILED DESCRIPTION

FIG. 1A is a functional block diagram of an electronic device 100 including a touch controller 102 that executes a false touch reduction algorithm 104 according to one embodiment. In operation, the touch controller 102 captures frame data from a touch screen 106 and dynamically or adaptively adjusts this frame data to more reliably detect the presence of touches or touch points P(X,Y) on the touch screen, as will described in more detail below. The touch controller 102 adjusts the scanned frame data to adaptively follow or track changes in the frame data that occur during a touch or touch point and in this way reduces the detection of false touches, as will also be described in more detail below.

In the following description, certain details are set forth in conjunction with the described embodiments to provide a sufficient understanding of the invention. One skilled in the art will appreciate, however, that the invention may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present invention.

Figure 1:
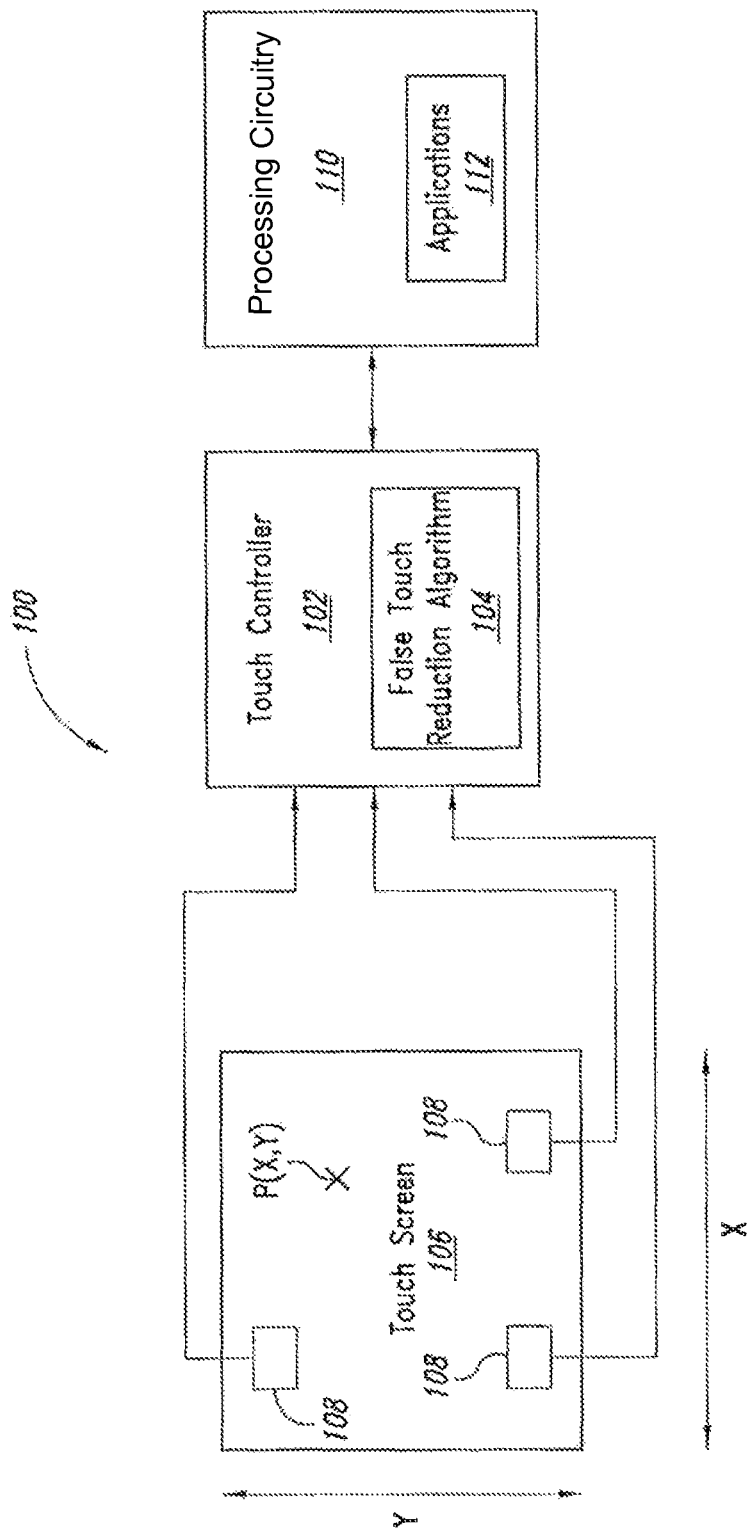
FIG. 1 is a functional block diagram of an electronic device including a touch controller operable to execute a false touch reduction algorithm according to one embodiment.

The touch screen 106 includes a number of touch sensors 108 positioned on the touch screen to detect touch points P(X,Y), with three touch sensors being shown in the example of FIG. 1. A user touching the touch screen 106 with his or her finger, stylus, or other suitable device corresponds to a touch point P(X,Y). An X-axis and Y-axis are shown in FIG. 1, with the X coordinate of a touch point P(X,Y) corresponding to a point along the X-axis and the Y coordinate to a point along the Y-axis. A touch point $P(X_1,Y_1)$, for example, corresponds to a touch point on screen 106 at location $X_1$ on the X-axis and $Y_1$ on the Y-axis.

The touch sensors 108 generate corresponding sensor signals responsive to a touch point P(X,Y) and provide these signals to the touch controller 102 for processing. The touch sensors 108 are typically contained in some sort of transparent sensor array that is part of the touch screen 106. The number and location of the touch sensors 108 can vary as can the particular type of sensor, such as ultrasonic, resistive, vibration, or capacitive sensors, as will be appreciated by those skilled in the art. Embodiments will now be described where the touch sensors 108 are capacitive touch sensors, but the concepts disclosed with reference to these embodiments may be applied to other types of touch sensors as well where similar variations in a given parameter result during the occurrence of a touch point.

The electronic device 100 further includes processing circuitry 110 coupled to the touch controller 102 and operable to execute applications or "apps" 112 designed to perform a specific function or provide a specific service on the electronic device 100. Where the electronic device 100 is a cellular phone or a tablet computer, for example, the applications 112 can include a wide variety of different types of applications, such as music applications, email applications, video applications, game applications, weather applications, reading applications, and so on. The touch controller 102 reports touch information to the applications 112, which operate in response thereto to control operation of the application and/or the electronic device. The processing circuitry 110 may be any suitable processing circuitry, such as a microprocessor where the electronic device 100 is a personal computer or an applications processor where the electronic device is a smart phone or tablet computer.

Figures 2A, 2B:
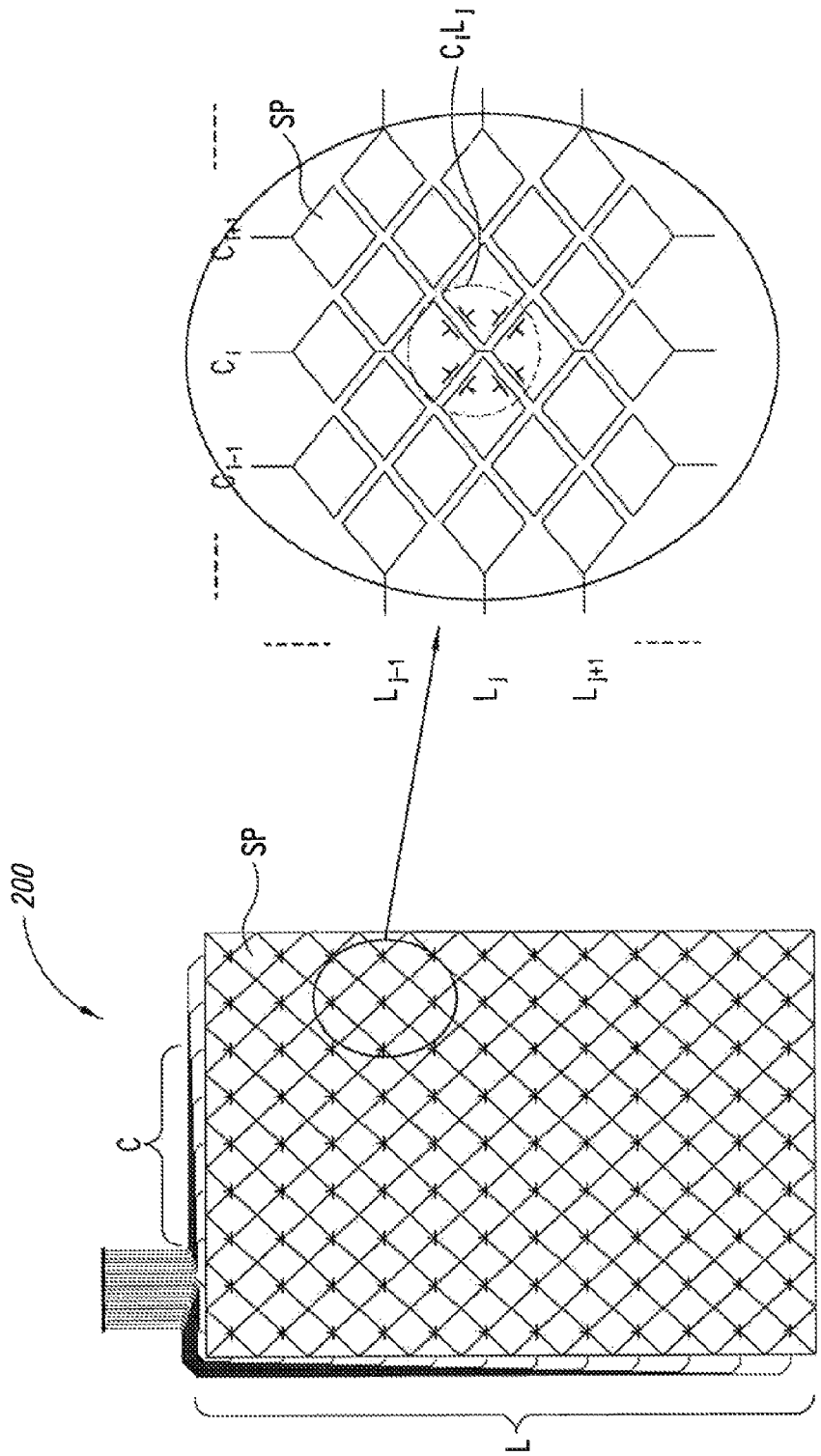
FIG. 2A is more detailed diagram of one type of capacitive touch sensor that may be part of the touch screen of FIG. 1.
FIG. 2B is an exploded portion of the capacitive touch sensor of FIG. 2A illustrating fringing capacitances at a sensor node of the touch sensor.

FIG. 2A is more detailed diagram of one type of capacitive touch sensor array 200 that may be part of the touch screen 106 of FIG. 1. The capacitive touch sensor array 200 corresponds to the touch sensors 108 of FIG. 1. In the structure of FIG. 2A, the capacitive touch sensor array 200 includes a plurality of sense lines Lj and a plurality of orthogonally arranged force lines Ci. Each sense line Lj and force line Ci is a conductive line having a plurality of diamond-shaped conductive sense pads SP arranged along a length of the sense or force line, as seen in the array 200. For a given sense line Lj or force line Ci, the conductive sense pads SP of that line are all electrically connected to one another to form the line. This is more easily seen in the exploded view of FIG. 2B showing a portion of the capacitive touch sensor array 200 of FIG. 2A.

Three force lines Ci−1, Ci, and Ci+1 and three sense lines Lj−1, Lj, and Lj+1 are shown in the exploded view of FIG. 2B. In FIG. 2B, the diamond-shaped conductive sense pads SP of the force lines C are shown interconnected to one another. While no such interconnection is shown for the conductive sense pads SP of the sense lines L, this has been done merely to simplify and clarify FIG. 2B, but it should be pointed out that the diamond-shaped conductive sense pads SP of the sense lines S are also connected to one another even though not shown in the figure. The intersections of the force lines C and sense lines L define sensor nodes CiLj, as expressly shown for one such sensor node in the center of FIG. 2B. FIG. 2B also shows the four fringing capacitances C that are affected by the occurrence of a touch point P(X,Y) on a sensor node CiLj. As seen in the figure, the fringing capacitances C are capacitances between adjacent sense pads SP in a force line C and the proximate sense pads of an adjacent sense line L. In the example of FIG. 2B, the fringing capacitances C are formed between the sense pads SP in the force line Ci and the adjacent sense pads of the sense line Lj. The values of these fringing capacitances C vary as a function of whether a touch point P(X,Y) is present or not, and these changes are detected by the touch controller 102 to detect such touch points, as will now be explained in more detail with reference to FIG. 3.

Figure 3:
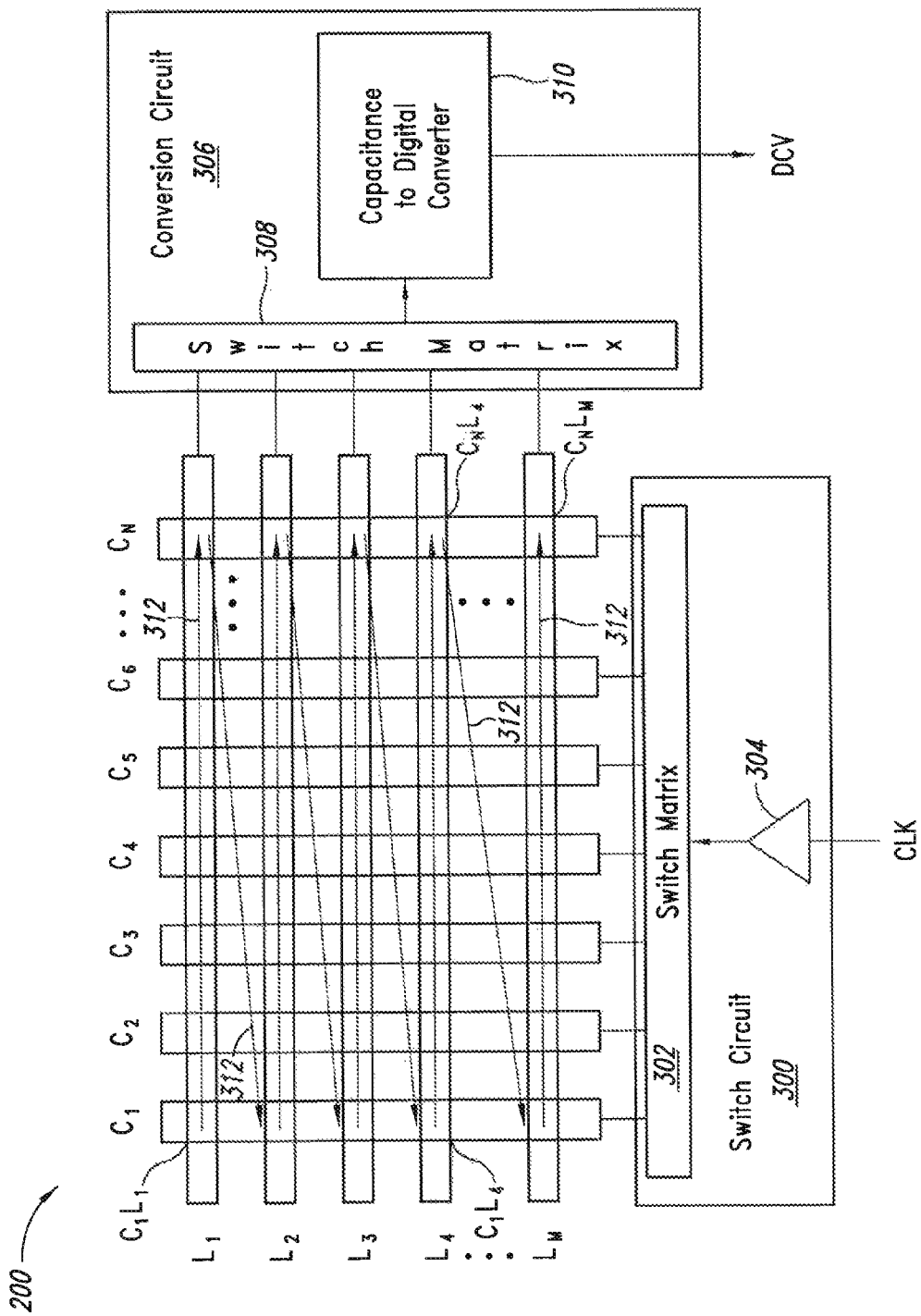
FIG. 3 is a functional diagram illustrating in more detail the operation of the touch controller of FIG. 1 in executing the false touch reduction algorithm to reliably detect the presence of a touch point on the touch screen.

FIG. 3 is a functional diagram illustrating in more detail the operation of the touch controller 102 of FIG. 1 in executing the false touch reduction algorithm 104 to reliably detect the presence of a touch point on the touch screen 106. FIG. 3 includes a functional representation of the touch sensor array 200 and the orthogonally arranged sense lines L and force lines C. The force lines C are shown over the sense lines L in the figure with the lines being capacitively coupled at the intersections of the orthogonal lines. Thus, each intersection of a force line C and a sense line L forms a sensor node CiLj, where i=1−N and j=1−M (i.e., the value of i varies from i=1 to i=N while the value of j varies from j=1 to j=M), with N being the total number of force lines and M being the total number of sense lines in the touch sensor array 200.

The force lines C are coupled to a switching circuit 300 including a first switch matrix 302 that receives a clock signal CLK applied through a buffer circuit 304 and selectively applies the clock signal to respective force C2 lines C. The switching circuit 300 is part of the touch controller 102 (FIG.

1). In the example of FIG. 3, the touch sensor array 200 includes N force lines C and so the touch controller 102 controls the first switch matrix 302 to sequentially apply the clock signal CLK on force line C1, then on force line C2, then force line C3, and so on through the final rightmost force line CN. A conversion circuit 306, which is also part of the touch controller 102, includes a switch matrix 308 coupled to the sense lines L. The touch controller 102 controls the switch matrix 308 to sequentially couple a respective selected sense line L to a capacitance-to-digital converter 310 that determines a capacitance value for each sensor node CiLj associated with the selected sense line and converts each capacitance value to a corresponding digital capacitance value DCV, as will be explained in more detail below.

In operation, the touch controller 102 controls the switch circuit 300 and conversion circuit 306 to operate in combination and sequentially scan each sensor node CiLj of the touch sensor array 200, detect the capacitance value at each sensor node, and convert each such detected capacitance value to a corresponding digital capacitance value DCV. The touch controller 102 then executes the false touch detection algorithm 104 (FIG. 1) to adjust the detected digital capacitance value for each sensor node and thereafter determines for each sensor node whether the adjusted value indicates the occurrence of a touch point P(X,Y) at the corresponding sensor node, as will be explained in more detail below.

The operation of the touch controller 102 in controlling the switch circuit 300 and conversion circuit 306 to generate the digital capacitance value DCV for each of the sensor nodes CiLj in the touch sensor array 200 will first be described with reference to FIG. 3. For a given scan of all the sensor nodes CiLj of the touch sensor array 200, the corresponding digital capacitance values collectively form a data frame. After the description of the operation of the touch controller 102 in controlling the switch circuit 300 and conversion circuit 306 to generate a data frame, the operation of the touch controller 102 in executing the false touch reduction algorithm 104 to process the data frame and detect the presence of touch points P(X,Y) will thereafter be described with reference to FIGS. 4 and 5.

The switch circuit 300 and the conversion circuit 306 are part of the touch controller 102, and so these components are operating under control of or as part of the operation of the touch controller. In the following description, however, for the sake of brevity, the circuits 300 and 306 may be described as simply taking some action or performing a particular function, eliminating the need to state that that each component is operating under control of or as part of the operation of the touch controller.

In operation, the touch controller 102 initially controls the switch matrix 308 to couple the first sense line L1 to the capacitance-to-digital converter 310. The switch matrix 302 at this point initially applies the CLK signal to the first force line C1. The CLK signal applied to the first force line C1 is thereby coupled to the first sense line L1 via the capacitive sensor node C1L1 in the upper left corner of the touch sensor array 200. The value of the capacitance of the sensor node C1L1 affects the capacitive coupling between the force line C1 and sensor line L1 and, as explained above with reference to FIGS. 2A and 2B, this capacitance value is a function of whether a touch point P(X,Y) is present at the sensor node C1L1. Presence of a touch point P(X,Y) increases the capacitive coupling while absence of a touch point decreases the capacitive coupling. Thus, the presence or absence of a touch point P(X,Y) at sensor node C1L1 affects the value of the capacitive coupling between the force line C1 and the sense line L1 and thereby affects the characteristics of the coupled signal that is generated on the sense line L1 in response to the CLK signal applied to the force line C1. When a touch point P(X,Y) is present at the sensor node C1L1, the resulting coupled signal on the sense line L1 has a value that is a function of the value of the capacitance of the sensor node. In this way the capacitance value of the sensor node C1L1 can be determined from the coupled signal on the sense line L1.

The sense line L1 is coupled through the switch matrix 308 to the capacitance-to-digital converter 310. The converter 310 determines the value of the capacitance of the sensor node C1L1 from the coupled signal on the sense line L1 and digitizes this value to generate the corresponding digital capacitance value DCV. The DCV value for the sensor node C1L1 is one value in the current data frame that is being generated and is output from the conversion circuit 306 and utilized by the false touch reduction algorithm 104 in detecting the presence of touch points P(X,Y) in the current data frame, as will be explained in more detail below. The digital capacitance value DCV may be any digitized value that is derived by the conversion of capacitance to a digital frame format such as digitized voltage levels. Also note the DCV is generally a digital value representing some parameter of each sensor node CiLj and may be other than a capacitance value in other embodiments where the touch sensor array 200 not a capacitive array but is instead another type of touch sensor array.

After generating the DCV value for the sensor node C1L1, the switch matrix 302 applies the CLK signal to the second force line C2 while keeps switch matrix 308 keeps the first sense line L1 coupled to the capacitance-to-digital converter 310. The CLK signal applied on the second force line C2 is once again coupled to the first sense line L1 via the capacitance of sensor node C2L1. The value of this capacitance once again determines the characteristics of the coupled signal on the sense line L1. The coupled signal on the sense line L is once again coupled through the switch matrix 308 to the capacitance-to-digital converter 310 which, in turn, determines the value of the capacitance of the sensor node C2L1 and outputs the corresponding digital capacitance value DCV.

The operation continues in this same way for each of the remaining sensor nodes C3L1-CNL1, with CLK signal being sequentially applied to the remaining force lines C3-CN and the capacitance-to-digital converter 310 sequentially generating digital capacitance values DCV for each sensor node C3L1-CNL1. The digital capacitance values DCV for the sensor nodes C1L1-CNL1 are designated using the notation DCVij in the following description, such that the value DCV for the sensor node C1L1 is designated DCV11, the value DCV21 for the sensor node C2L1, and so on with the value DCV for sensor node CNL1 being designated DCVN1.

After the determination of the digital capacitance value DCV for the final sensor node CNL1 coupled to the first sense line L1 the switch matrix 308 uncouples the first sense line from the capacitance-to-digital converter 310 and couples the second sense line L2 to the capacitance-to-digital converter. The switch matrix 302 and converter 310 thereafter operate in the same manner to sequentially apply the CLK signal to the force lines C1-CN and convert the corresponding generated coupled signals on the sense line L2 to generate the digital capacitance values DCV12-DCVN2 for the sensor nodes C1L2-CNL2. After doing this for the all the sensor nodes C1L2-CNL2 coupled to the second sense line L2, the switch matrix 308 uncouples the second sense line from the capacitance-to-digital converter 310 and couples the third sense line L3 to the capacitance-to-digital converter. The switch matrix 302 and converter 310 thereafter once again operate in the same manner to sequentially apply the CLK signal to the force lines C1-CN and convert the corresponding generated coupled signals on the sense line L3 to generate the digital capacitance values DCV13-DCVN3 for the sensor nodes C1L3-CNL3. This continues for each of the remaining sense lines L4-LM. The pattern in which the sense nodes C1L1-CNLM are scanned to generate the corresponding digital capacitance values DCV11-DCVNM is a raster pattern as designated by the arrows 312 in FIG. 3. Thus, the raster pattern indicated by arrows 312 is formed by the sensor nodes CiLj coupled to each sense line L1-LM being sequentially scanned from left-to-right as seen by the arrows 312.

Once the capacitance-to-digital converter 310 has generated the digital capacitance value DCVNM for the sensor node CNLM, a complete data frame has been generated. The false touch reduction algorithm 104 then processes this data frame to detect touch points P(X,Y) in the data frame, as will be described in more detail below. While the touch reduction algorithm 104 executes to process a given data frame, the switch circuit 300 and conversion circuit 306 operate in the same manner to generate a next data frame for processing. The circuits 300 and 306 operate to continually scan the sensor nodes C1L1-CNLM and generate corresponding data frames. There is an inter-frame time between completion of the capturing of a given data frame and the start of capturing the next data frame. This inter-frame time is set to a suitable value that provides scanning frequently enough to properly detect all touch points P(X,Y) while not scanning so frequently to unnecessarily consume power of the electronic device 100, as will be appreciated by those skilled in the art.

Figure 4:
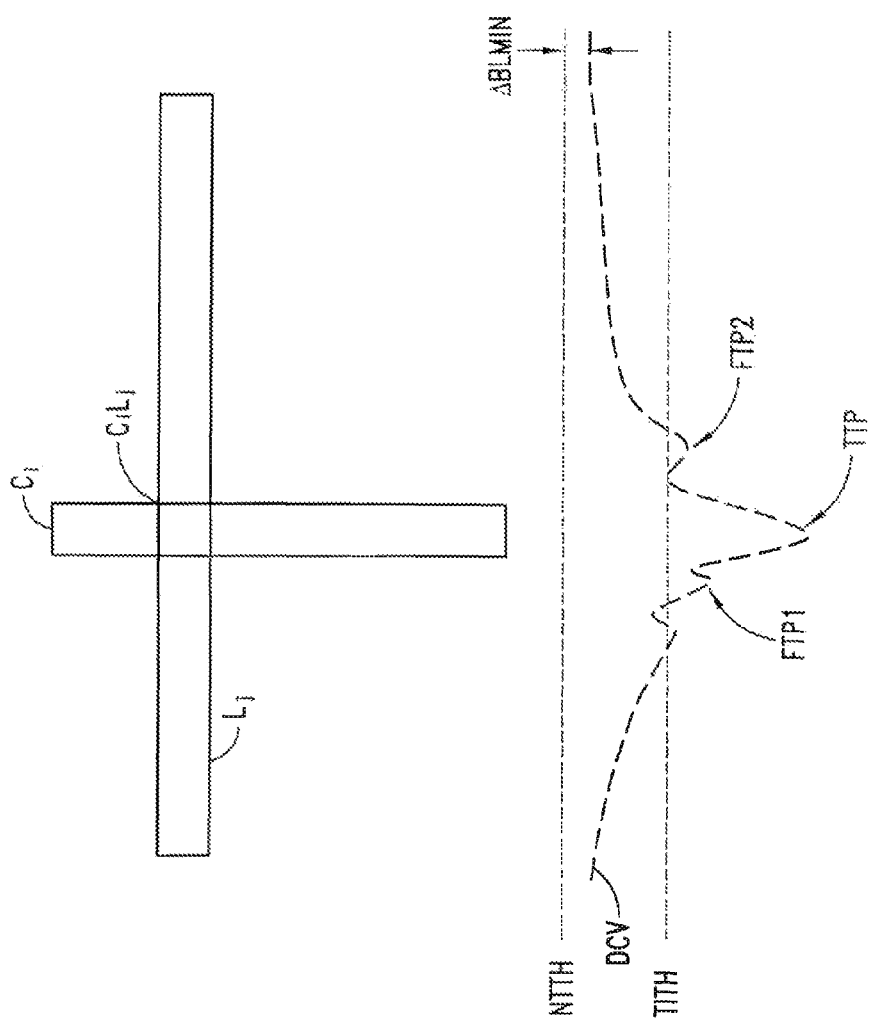
FIG. 4 is a graph illustrating the variation in capacitance values of sensor nodes in the touch sensor array of FIG. 3 along with no-touch and touch-in thresholds that result in the detection of several false touch points.
Figure 5:
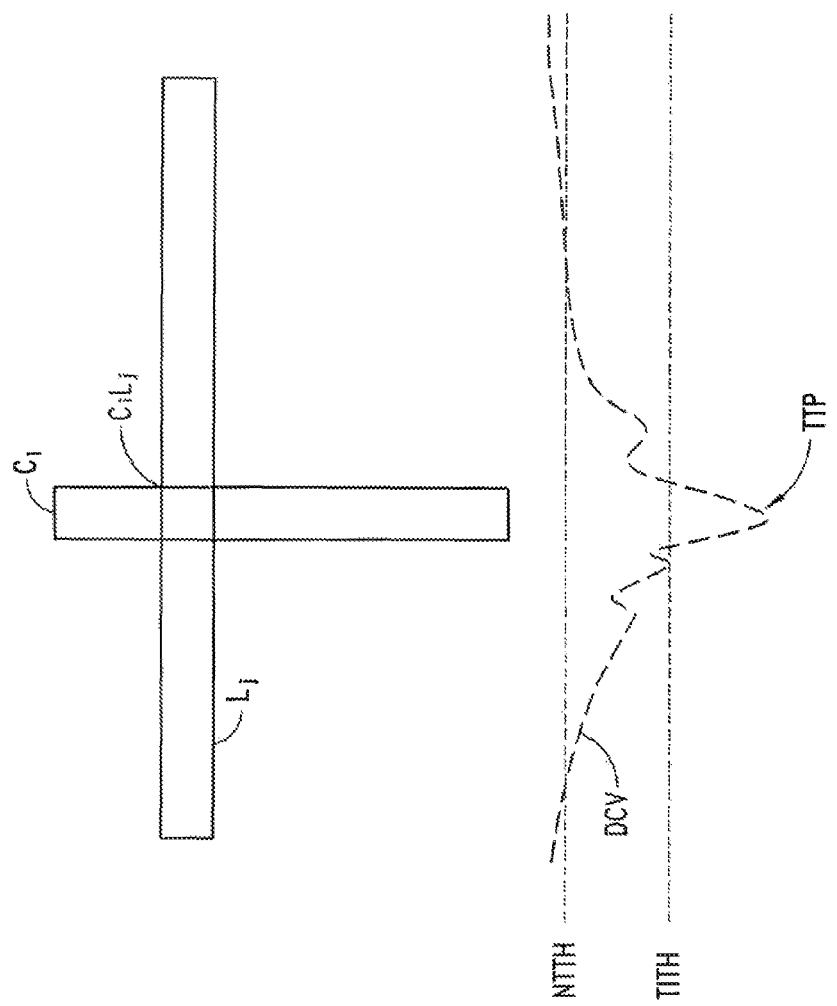
FIG. 5 is a graph illustrating the variation in capacitance values of sensor nodes of the touch sensor array of FIG. 3 along with execution of the false touch reduction algorithm in adjusting the associated frame data relative to the no-touch and touch-in thresholds to more reliably detect the presence of touch points according to one embodiment.

Turning now to FIGS. 4 and 5, these figures will be utilized to describe the operation of the false touch reduction algorithm 104 processing the digital capacitance values DCV in a given data frame reliably detect touch points P(X,Y) and reduce the false detection of touch points. The top of FIG. 4 illustrates a sensor node CiLj and the corresponding sense line Lj and force line Ci that form that sensor node. Also shown in FIG. 4 is a baseline or no-touch threshold NTTH that defines a reference capacitance value for each sensor node CiLj in the touch sensor array 200 (FIGS. 2 and 3) when no touch point P(X,Y) is present. Also shown is a touch-in threshold TITH that defines a threshold that the digital capacitance value DCV of a sensor node CiLj must exceed in order to indicate the detection of or presence of a touch point P(X,Y) at that sensor node.

FIG. 4 also shows the frame data, which is the data for the given data frame being considered. The frame data is shown as the digital capacitance values DCV for the sensor nodes CiLj coupled to the corresponding sense line Lj. Due to the affects of a single touch point P(X,Y) on all the sensor nodes CiLj associated with the sense line Lj, the frame data digital capacitance values DCV vary as shown for the sensor node CiLj associated with this sense line Lj. This occurs because the increase in capacitance caused by a single touch point P(X,Y) on a single sensor node CiLj associated with a given sense line L affects the values of the capacitance of all sensor nodes CiLj associated with that sense line L. As a result, the change in capacitance caused by the single touch point P(X,Y) can affect the capacitance values of other sensor nodes CiLj associated with the corresponding sense line L by enough that these other sense nodes have digital capacitance values DCV that exceed the touch-in threshold TITH, thereby indicating a "false touch" or false touch point.

The occurrence of several false touch points FTP is shown in FIG. 4. Thus, even though the touch point P(X,Y) occurs at the sensor node CiLj shown in the center of the figure, the frame data shows the resulting change in digital capacitance values DCV of other sensor nodes associated with the same sense line Lj also change by enough to exceed the touch-in threshold TITH, falsely indicating the occurrence of touch points P(X,Y) at these other sensor nodes as well. The true touch point P(X,Y) is designated TTP in FIG. 4. A first false touch point FTP1 to the left of the true touch point TTP and a second false touch point to the right of the true touch point are also shown. This means the true touch point TTP for the sensor node CiLj in the center of the figure is properly detected, but that adjacent sensor nodes (not shown) to the left and right of this sensor node along the sense line Lj also have their digital capacitance values DCV changed by the true touch point such that the digital capacitance values of these adjacent sensor nodes exceed the touch-in threshold TITH, falsely indicating the presence of a touch point P(X,Y) at these nodes as well.

FIG. 5 is a graph illustrating the variation in digital capacitance values DCV of sensor nodes CiLj associated with a sense line L of the touch sensor array 200 after the processing of these digital capacitance values by the false touch reduction algorithm 104 of FIG. 3. In operation, the false touch reduction algorithm 104 adjusts each of the digital capacitance values DCV for the sensor nodes CiLj associated with a given sense line L prior to the processing of these digital capacitance values by the touch controller 102 to detect the presence of touch points P(X,Y). As mentioned above, the baseline or no-touch threshold NTTH defines a reference capacitance value for each sensor node CiLj in the touch sensor array 200 (FIGS. 2 and 3) when no touch point P(X,Y) is present. This is shown in FIGS. 4 and 5 as a constant threshold capacitance value for each of the sensor nodes CiLj associated with the sensor line Lj, although these no-touch thresholds NTTH could vary among sensor nodes in other embodiments. The no-touch thresholds NTTH can be derived in a variety of different ways, such as by using a suitable calibration or frame accumulation method, as will be understood by those skilled in the art. For the sake of brevity and so as to not unnecessarily obscure the present description, and because those skilled in the art will understand the generation of the no-touch thresholds NTTH for each sensor node will not be described in more detail herein.

Figure 6:
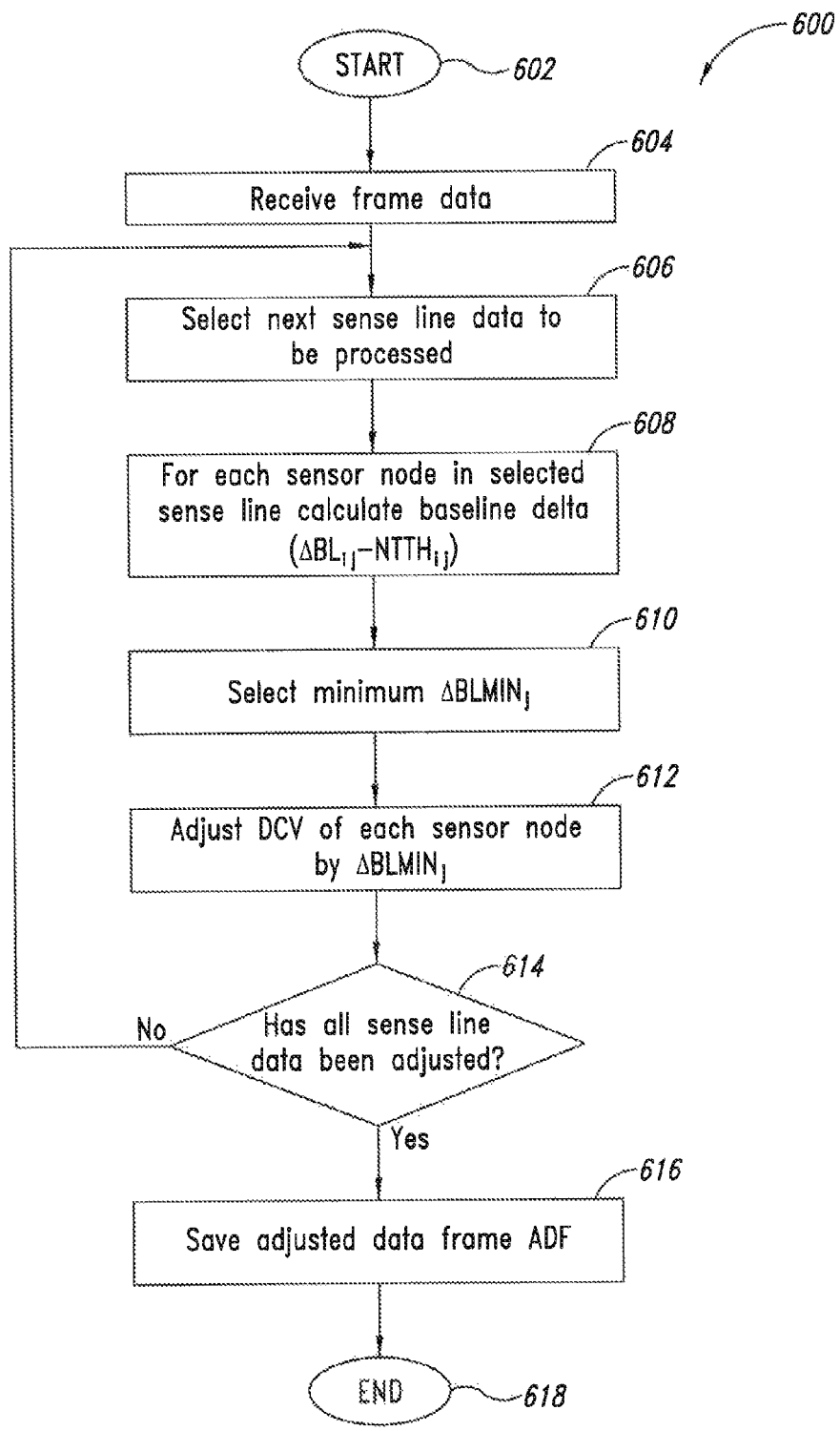
FIG. 6 is a flowchart illustrating a process corresponding to the false touch reduction algorithm of FIG. 1 according to one embodiment.

One embodiment of a process 600 corresponding to the false touch reduction algorithm 104 will now be described in more detail with reference to the flowchart of FIG. 6. The process 600 begins in step 602 proceeds immediately step 604 in which the current data frame to be processed for the detection of touch points P(X,Y) is received. Recall, the data frame includes the digital capacitance values DCVij for i=1-N and j=1-M and thus for all the sensor nodes CiLj in the touch sensor array 200 (FIG. 3). The process 600 then proceeds to step 606 and selects the next sense line data to be processed, where the term "sense line data" is used to refer to the digital capacitance values DCV for all sensor nodes CiLj associated with a given sense line L. So this first time through the current data frame, the sense line data for the first sense line L1 is selected in step 606.

From step 606 the process 600 then proceeds to step 608 and calculates, for each sensor node CiLj in the selected sense line L, a baseline delta $\Delta BL$ corresponding to the difference between the digital capacitance value DCV for that sensor node and the corresponding baseline or no-touch threshold NTTH for the sensor node. So where there are N force lines and thus N sensor nodes CiLj associated with each sense line L, the process 600 in step 608 determines N baseline deltas $\Delta BLij$ for the N sensor nodes. The baseline deltas $\Delta BLij$ are identified in the same way the corresponding sensor node CiLj, so for sensor node C1L1 the corresponding baseline delta $\Delta BL11$ is determined, for sensor node C2L1 the corresponding $\Delta BL21$ is determined, and so on. For example, the sensor node C1L1 has a digital capacitance value DCV11 and if the corresponding no-touch threshold NTTH is designated NTTH11, then the process 600 determines in step 608 for this node the baseline delta ΔBL11=DCV11−NTTH11. For the sensor node C2L1, step 608 determines the baseline delta ΔBL21=DCV21−NTTH21.

Once the N baseline deltas ΔBLij for each sensor node CiLj in the first selected sense line L1 have been determined, the process 600 then proceeds to step 610 and selects the minimum baseline delta ΔBLMINj from the N calculated baseline deltas. At this point j=1 since the sense line data for the first sense line L1 is currently being processed, and thus the minimum baseline delta ΔBLMIN1 is selected for the sense line L1. For example, if the baseline delta ΔBL21 for the sensor node C2L1 has the smallest value of all the baseline deltas ΔBLij calculated for the selected sense line data, then the minimum baseline delta ΔBLMIN1 for the first sense line L1 is set equal to the baseline delta ΔBL21 (i.e., ΔBLMIN1=ΔBL21). A sample minimum baseline delta ΔBLMIN is illustrated on the right side of FIG. 4. This graphically illustrates the minimum baseline delta ΔBLMIN, which is the smallest baseline delta ΔBLij for the selected sense line data being processed.

From step 610 the process 600 goes to step 612 and adjusts the sense line data being processed by subtracting the minimum baseline delta ΔBLMIN1 from each of the digital capacitance values DCV11-DCVN1 for the sensor nodes CiLj associated with the selected sense line L1. The adjusted sense line data is designated DCVADJ11-DCVADJN1 for the first sense line L1 initially being processed, where DCVADJ11=DCV11−ΔBLMIN1, DCVADJ21=DCV21−ΔBLMIN1, and so on through DCVADJN1=DCVN1−ΔBLMIN1. In this way, the process 600 adjusts the digital capacitance values DCV of each sensor node CiLj of the current sense line L1 by the minimum baseline delta ΔBLMIN1 prior to the touch controller 102 (FIG. 1) processing this sense line data to detect touch points P(X,Y).

At this point, the process 600 has generated the adjusted sense line data DCVADJ11-DCVADJN1 for the initial sense line L1, and proceeds to step 614 and determines whether the sense line data for all sense lines Lj has been adjusted. When the determination in step 614 is negative, meaning the sense line data for all sense lines Lj has not yet been adjusted, the process 600 returns to step 606 and selects the next sense line. So in this situation the sense line data for the second sense line L2 is now be selected, and the steps 608-612 are thereafter executed to process this sense line data as previously described and in this way generates adjusted sense line data DCVADJ12-DCVADJN2 for the second sense line L2. The process 600 repeats in this manner, executing steps 606-614 to adjust the sense line data for the sense line L3, then sense line L4, and so on until the adjusted sense line data DCVADJ1M-DCVADJNM for the final sense line LM has been generated. In sum, a The determination in step 614 is positive once the adjusted sense line data DCVADJ1M-DCVADJNM for the final sense line LM and thus for all the sense lines (i.e., for the entire data frame) has been generated. This adjusted sense line data DCVADJ11-DCVADJN1 is illustrated in FIG. 5 for comparison to the initial sense line data DCV11-DCVN1 shown in FIG. 4. As seen by comparing FIGS. 4 and 5, the adjusted sense line data DCVADJ11-DCVADJN1 of FIG. 5 is shifted upward relative to that of FIG. 4 due to the subtraction of the minimum baseline delta ΔBLMIN1 from each digital capacitance value. Note in other situations the adjusted sense line data DCVADJ11-DCVADJN1 could be shifted downward, depending on the sign (i.e., positive or negative) of the minimum baseline delta ΔBLMIN1. When the determination in step 614 is positive, all values DCV in the current data frame have been adjusted and the false touch reduction process 600 proceeds to step 616 and saves all these adjusted values as an adjusted data frame ADF. The process 600 then proceeds to step 618 and terminates.

The touch controller 102 (FIG. 1) thereafter processes the adjusted data frame ADF to detect touch points P(X,Y) in the data frame. As seen in FIG. 5 for the sample sense line Lj illustrated, the adjusted sense line data DCVADJ1j-DCVADJNj eliminates the occurrence of at least some of the false touch points FTP present in the initial sense line data of FIG. 4. More specifically, the touch controller 102 compares each adjusted digital capacitance value DCVADJij to the touch-in threshold TITH shown in FIG. 5. When an adjusted digital capacitance value DCVADJij reaches or exceeds the touch-in threshold TITH, a touch point P(X,Y) is determined to have occurred at that sensor node CiLj. The touch controller 102 processes the entire adjusted data frame ADF and reports the occurrence of detected touch points P(X,Y) to the application 112 (FIG. 1) executing on the processing circuitry 110 (FIG. 1), which takes appropriate action in response to the detected touch point or points in the adjusted data frame. In this way the process 600, which corresponds to one embodiment of the false touch reduction algorithm 104, eliminates or at least reduces the occurrence of the detection of false touch points P(X,Y). This is true because the minimum baseline delta ΔBLMIN is presumably an incidental change for one of the sensor nodes CiLj in the same sense line L in which a touch point P(X,Y) has occurred at some other sensor node of the same sense line. Thus, by adjusting the digital capacitance values DCV of each sensor node CiLj of the sense line L by the minimum baseline delta ΔBLMIN this incidental change is effectively zeroed out or eliminated. The minimum baseline delta ΔBLMIN is chosen since this represents the smallest incidental change for all sensor nodes CiLj in the sense line L.

One skilled in the art will understood that even though various embodiments and advantages have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. A touch controller operable to;
   determine, for each one of a plurality of digital capacitance values in a group of sense line data, a baseline delta value as being a difference between the digital capacitance value and an associated no-touch threshold;
   select a minimum baseline delta value;
   adjust each digital capacitance value in the group by the minimum baseline delta value to generate corresponding groups of adjusted sense line data; and
   process the groups of adjusted sense line data to detect touch points in the data frame by comparing each adjusted digital capacitance value in the adjusted sense line data to a touch-in threshold, and detect the presence of a touch point when the adjusted digital capacitance value reaches or exceeds the touch-in threshold,
   wherein the touch-in threshold is a constant value to which every adjusted digital capacitance value is compared.

2. The touch controller of claim 1, wherein the touch controller adjusts each digital capacitance value in the group by subtracting the minimum baseline delta value from the digital capacitance value.

3. The touch controller of claim 1, wherein the data frame comprises an N×M array of digital capacitance values where N corresponds to the number of force lines and M to the number of sense lines in a touch sensor array, and wherein each group of sense line data corresponds to N digital capacitance values associated with a corresponding sense line of the touch sensor array.

4. The touch controller of claim 3 further comprising a conversion circuit coupled to receive signals on the sense lines and convert each of these received signals to a corresponding digital capacitance value.

5. The touch controller of claim 4 further comprising a switch circuit coupled to the force lines and operable to sequentially apply a clock signal on each of the force lines.

6. An electronic device, comprising:
   a touch sensor array including a plurality of sensor nodes operable to detect the presence of touch points;
   processing circuitry operable to execute applications;
   a touch controller coupled to the touch sensor array and to the processing circuitry, the touch controller operable to;
   sequentially scan each sensor node of the touch sensor array;
   generate a corresponding digital capacitance value for each sensor node, the digital capacitance values of a given scan collectively forming a data frame and digital capacitance values being organized as groups of sense line data;
   determine for each digital capacitance value in a group of sense line data the difference between the digital capacitance value and an associated no-touch threshold to generate a baseline delta value for each digital capacitance value in the group;
   select the minimum baseline delta value and adjust each digital capacitance value in the group by the minimum baseline delta value to generate adjusted sense line data,
   generate adjusted sense line data for each group of sense line data in the data frame; and
   process the groups of adjusted sense line data to detect the presence of touch points in the data frame by comparing each adjusted digital capacitance value in the adjusted sense line data to a touch-in threshold, and detect the presence of a touch point when the adjusted digital capacitance value reaches or exceeds the touch-in threshold,
   wherein the touch-in threshold is a constant value to which every adjusted digital capacitance value is compared.

7. The electronic device of claim 6, wherein the touch sensor array comprises:
   a plurality of sense lines
   a plurality of orthogonally arranged force lines;
   a plurality of sensor nodes at the overlap portions of sense and force lines.

8. The electronic device of claim 7, where each sense line and each force line comprises a conductive line having a plurality of diamond-shaped conductive sense pads arranged along a length of the sense line or force line.

9. The electronic device of claim 7, wherein the ouch controller comprises:
   a switch circuit including,
   a buffer circuit having an input adapted to receive a clock signal and an output;
   a switch matrix coupled to the output of the buffer circuit and coupled to the force lines, the switch circuit operable to sequentially provide the clock signal at the output of the buffer circuit on respective force lines; and
   a conversion circuit including,
   a capacitance-to-digital converter operable to generate a digital capacitance value from a coupled signal provided on an input of the capacitance-to-digital converter;
   a switch matrix coupled to the sense lines and coupled to the input of the capacitance-to-digital converter, the switch matrix operable to couple a selected sense line to the input of the capacitance-to-digital converter and thereby provide the coupled signal on the selected sense line to the capacitance-to-digital converter for generation of corresponding digital capacitance values.

10. The electronic device of claim 7, wherein the processing circuitry comprises smart phone processing circuitry.

11. The electronic device of claim 9, wherein the touch controller adjusts each digital capacitance value in the group by subtracting the minimum baseline delta value from the digital capacitance value.

12. A method of processing data frames to detect the presence of touch points, each data frame including a plurality of sense node values arranged as groups of sense node values, the method comprising:
   for each group of sense node values,
      determining the difference between each sense node value and an associated no touch threshold to provide a baseline delta value for each sense node value in the group;
      determining the minimum baseline delta value; and
      subtracting the corresponding minimum baseline delta value from each of the sense node values in the group to provide adjusted sense node values for the group; and
      processing the adjusted sense node values to detect the presence of touch points by comparing each adjusted sense node value to a corresponding touch-in threshold and detecting the presence of a touch point when the adjusted sense node value reaches or exceeds the threshold,
   wherein the touch-in threshold is a constant value to which every adjusted digital capacitance value is compared.

13. The method of claim 12, wherein each sense node value includes a digital capacitance value.

14. The method of claim 13, wherein each data frame includes an N×M array of digital capacitance values where N corresponds to the number of force lines and M to the number of sense lines in a touch sensor array, and wherein each group corresponds to N digital capacitance values associated with a corresponding sense line of the touch sensor array.

15. A touch controller operable to:
   determine, for each one of a plurality of digital touch sensor values in a group of sense line data, a baseline delta value as being a difference between the digital touch sensor value and an associated no-touch threshold;
   select a minimum baseline delta value;
   adjust each digital touch sensor value in the group by the minimum baseline delta value to generate corresponding groups of adjusted sense line data; and
   process the groups of adjusted sense line data to detect touch points in the data frame by comparing each adjusted digital touch sensor value in the adjusted sense line data to a touch-in threshold and detects the presence of a touch point when the adjusted digital touch sensor value reaches or exceeds the touch-in threshold, wherein the touch-in threshold is a constant value to which every adjusted digital touch sensor value is compared.

* * * * *

UNITED STATES PATENT AND TRADEMARK OFFICE
CERTIFICATE OF CORRECTION

| | | |
|---|---|---|
| PATENT NO. | : 9,041,684 B2 | Page 1 of 1 |
| APPLICATION NO. | : 13/585749 | |
| DATED | : May 26, 2015 | |
| INVENTOR(S) | : Maria Rhea Santos et al. | |

It is certified that error appears in the above-identified patent and that said Letters Patent is hereby corrected as shown below:

In the claims,

Column 10, Line 51:
"1. A touch controller operable to;" should read, --1. A touch controller operable to:--.

Column 11, Line 24:
"the processing circuitry, the touch controller operable to;" should read, --the processing circuitry, the touch controller operable to:--.

Column 11, Line 61:
"9. The electronic device of claim 7, wherein the ouch" should read, --9. The electronic device of claim 7, wherein the touch--.

Column 12, Line 26:
"value and an associated no touch threshold to provide" should read, --value and an associated no-touch threshold to provide--.

Signed and Sealed this
Ninth Day of February, 2016

Michelle K. Lee
*Director of the United States Patent and Trademark Office*